United States Patent [19]

Ludwig

[11] 4,316,057

[45] Feb. 16, 1982

[54] CIRCUIT ARRANGEMENT FOR THE AUTOMATIC, ADAPTIVE DISTORTION CORRECTION OF RINGINGS OF AT LEAST THREE-STAGE BASE BAND SIGNAL

[75] Inventor: Volker Ludwig, Gelting, Fed. Rep. of Germany

[73] Assignee: Siemens Aktiengesellschaft, Berlin and Munich, Fed. Rep. of Germany

[21] Appl. No.: 156,409

[22] Filed: Jul. 4, 1980

[30] Foreign Application Priority Data

Jul. 13, 1979 [DE] Fed. Rep. of Germany ....... 2928424

[51] Int. Cl.³ .............................................. H04L 25/02
[52] U.S. Cl. ........................... 178/63 E; 179/175.31 E
[58] Field of Search ................. 178/63 E, 69 A, 69 R, 178/45, 46, 63 R; 179/175.31 E; 375/4, 14, 17, 18, 34, 35, 36, 60, 76, 99, 103, 104

*Primary Examiner*—Thomas A. Robinson
*Attorney, Agent, or Firm*—Hill, Van Santen, Steadman, Chiara & Simpson

[57] ABSTRACT

Circuit arrangement for the automatic, adaptive, temporal distortion correction of the ringings of a multistage base band signal comprises a controlled-gain amplifier to which the distorted base band signal is supplied. A correction signal device generates a correction signal, and a summer generates the distortion corrected base band signal by adding of the correction signal and the signal emitted by the controlled-gain amplifier. The distortion corrected base band signal is supplied to a sample-and-hold circuit and its output signal, after rectification and smoothing, is compared to a reference value signal. The level of the distorted base band signal is controlled with the output signal of the comparator with the assistance of the controlled-gain amplifier.

9 Claims, 3 Drawing Figures

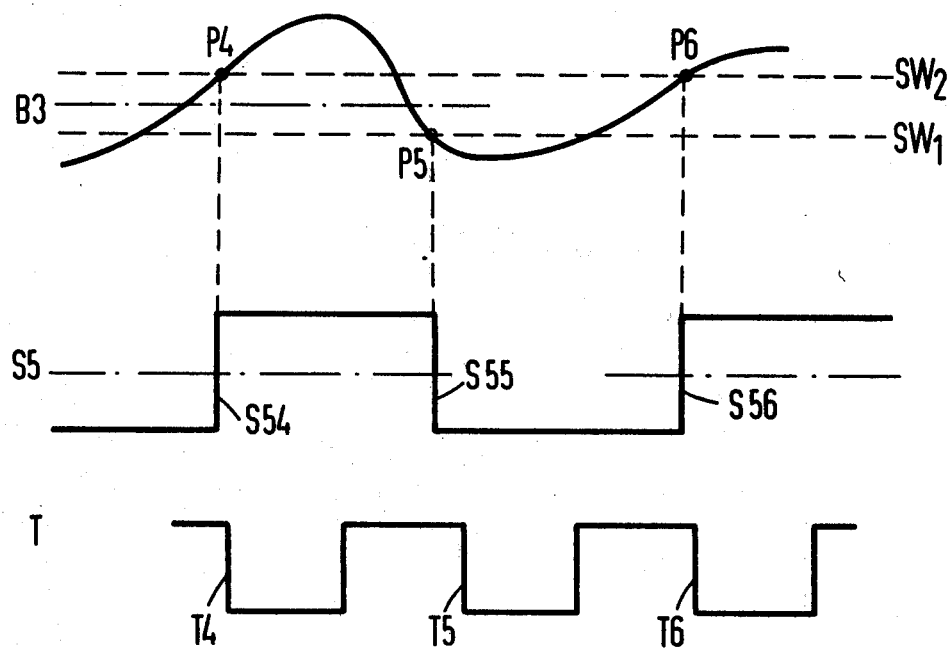

CIRCUIT ARRANGEMENT FOR THE AUTOMATIC, ADAPTIVE DISTORTION CORRECTION OF RINGINGS OF AT LEAST THREE-STAGE BASE BAND SIGNAL

BACKGROUND OF THE INVENTION

1. Field of the Invention

The present invention relates to a circuit arrangement for the automatic, adaptive, temporal distortion correction of the ringings of an at least three-stage base band signal which is transmitted via a loaded line, comprising a controlled-gain amplifier to which the distorted base band signal is supplied, a correction signal device which generates a correction signal as a function of the error of the distortion-corrected base band signal, and a summer which generates the distortion-corrected base band signal by addition of the correction signal and the signal emitted by the controlled gain amplifier.

2. Description of the Prior Art

As is known, data signals, particularly multi-stage base band signals, are distorted when they are transmitted over lines. Thereby, in addition to the primary oscillations, ringings also arise in the received base band signal which can render an evaluation of the base band signal significantly more difficult. Particularly when the base band signal is transmitted via a loaded line, for example, via a cable, then ringings can arise whose amplitudes are nearly as great as the amplitudes of the primary oscillations and which make an evaluation of the base band signal questionable.

SUMMARY OF THE INVENTION

The object of the invention is to provide a circuit arrangement for the automatic, adaptive, temporal distortion correction of the ringings, by which an at least three-stage base band signal can also be satisfactorily distortion corrected when this base band signal is transmitted via a loaded line.

The object of the invention is achieved in that a sample-and-hold circuit arrangement is provided to which the distortion corrected base band signal is supplied and whose output signal, after rectification, is compared in a first comparator with a first reference value signal, and the output signal of the first comparator is smoothed and a smoothed signal arises with which the level of the distorted base band signal is controlled with the assistance of a controlled-gain amplifier.

A circuit arrangement constructed in accordance with the invention provides distortion corrected base band signals in a satisfactory manner because, upon employment of the sample-and-hold circuit arrangement, only the amplitudes at the sampling times, but not the intervening amplitudes, are taken into consideration in the distortion correction. If, in the distortion correction process, for example, the peak values of the received signal were considered, then the distortion correction would be less satisfactory because, upon consideration of the peak values, the amplitudes at the sampling times need not, of necessity, be distortion corrected. A further advantage of the inventive circuit arrangement is to be seen in that a relatively low technical expense is required for smoothing the output signal of the sample-and-hold circuit arrangement because this output signal occurs rectangularly.

In order to prevent a properly distortion corrected base band signal from being simulated by the correction signal device in case of line break, it is advantageous that the signal emitted by the controlled-gain amplifier be compared in a second comparator with a second reference value signal and that the second comparator emits a blocking signal and reduces the level of the correction signal therewith in case the peak value of the signal emitted by the controlled-gain amplifier falls below the level of the second reference value signal.

When the correction signal device contains a digital arithmetic unit which generates the correction signal with the assistance of coefficient elements, then it is advantageous that the coefficient elements be adjusted with the assistance of the blocking signal.

It is advantageous for gaining a clock pulse signal at the receiving side that the distortion corrected base band signal be supplied to a threshold value stage which determines a first or, respectively, second threshold value and emits a threshold value signal whose pulse edges arise upon transgression of the first threshold value or, respectively, upon transgression of the second threshold value. A clock pulse generator is provided for generating a clock pulse signal whose phase relation is controlled with the assistance of the threshold value signal. A sample-and-hold circuit arrangement is driven with the clock pulse signal.

BRIEF DESCRIPTION OF THE DRAWINGS

Other objects, features, and advantages of the invention will be best understood from the following description, taken in conjunction with the accompany drawings, on which:

FIG. 3 illustrates signals which play a role in conjunction with the gain of the clock pulse.

DESCRIPTION OF THE PREFERRED EMBODIMENTS

Figure 1:
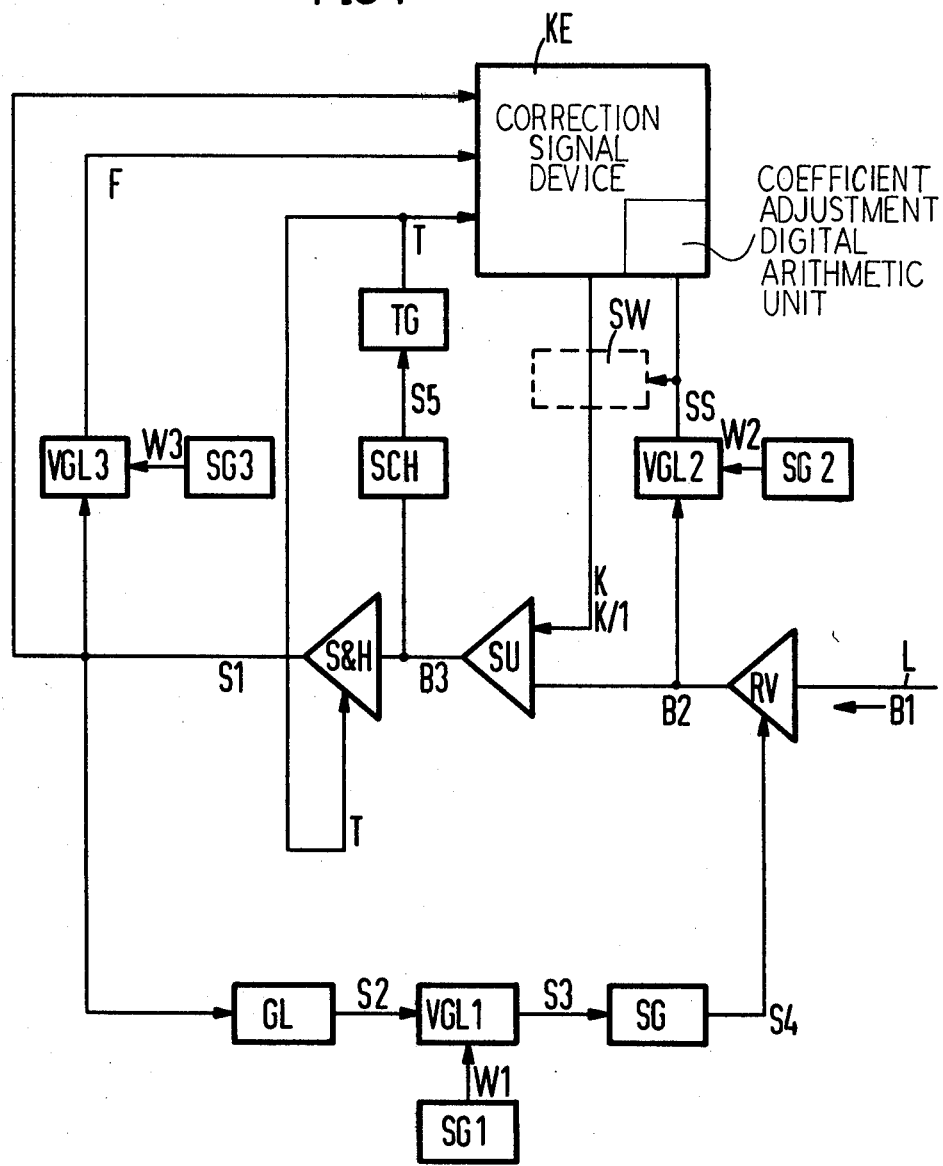
FIG. 1 a block diagram of a circuit arrangement for the adaptive distortion correction of the ringings of a base band signal.

FIG. 1 shows a circuit arrangement for the automatic, adaptive, temporal distortion correction of the ringings of a three-stage base band signal. This base band signal is transmitted via the lines L, whereby the base band signal becomes distorted. A loaded line, for example a cable segment provided with pupin coils, is presumed.

The received, distorted base band signal B1 is supplied to a controlled-gain amplifier RV. As a function of the error of the distortion corrected base band signal B3, a correction signal K is generated with the assistance of the correction signal device KE. The correction signal K and the output signal B2 of the controlled gain amplifier RV are added with the assistance of a summer SU, so that the distortion corrected base band signal B3 derives.

A sample-and-hold circuit S&H is provided for gaining a control signal, the distortion corrected base band signal B3 being supplied to the sample-and-hold circuit S&H whose output signal S1, after rectification in rectifier GL, is compared in a comparator VGL1 to a reference value signal W1. After smoothing in a filter SG, a signal S4 is obtained with the output signal S3 of the comparator VGL1 and the level of the distorted base band signal B1 is controlled with the assistance of the controlled gain amplifier RV.

In the following, the generation of this control signal will be described in greater detail on the basis of FIG. 2. The sample-and-hold circuit S&H is controlled with a clock pulse signal T. The received, distorted, base band signal B1 is supplied to the controlled-gain amplifier RV. The amplification factor of the controlled-gain amplifier RV is controlled with the assistance of a control signal S4. By so doing an amplified base band signal B2 arises at the output of the controlled-gain amplifier. Pseudoternary signals are presumed as the base band signals B1, B2. In particular, the amplified base band signal B2 more clearly exhibits the ternary values 0, 1, 2 of the pseudoternary signal.

First, a correction signal K is assumed which occurs entirely in the range of the 0 line. The summer SU sums the signals K and B2 so that, given the assumptions made, the signal 3 derives which is identical to the signal B2.

The sample-and-hold circuit S&H takes over the amplitudes a1 or, respectively a2 or, respectively a3 of the signal B3 at the times $t=1$, $t=3$, $t=5$ and retains these amplitudes during a period of the clock pulse signal T. Thereby, the times $t=1$, $t=3$, $t=5$ are determined by the positive pulse edges of the clock pulse signal T with which the sample-and-hold circuit arrangement S&W is driven. By so doing, the signal S1 occurs.

The signal S1 is rectified with the assistance of a rectifier GL, so that the signal S2 is produced. In the comparator VGL1, the signal S2 is compared to the reference value W1 of the reference value generaor SG1 and the signal S3 is emitted. With the assistance of the filter section SG, the signal S3 is smoothed, whereby the signal S4 occurs which serves for controlling the amplification factor of the controlled-gain amplifier RV. In case the signals S2 and W1 have the same amplitude, a control signal S4 is emitted which does not change the amplification factor of the controlled-gain amplifier RV. In case the amplitude of the signal S2 is smaller than the amplitude of the signal W1, then the control signal S4 effects an increase of the amplification factor, and in case the amplitude of the signal S2 is greater than that of the signal W1, then the control signal S4 effects a reduction of the amplification factor of the controlled-gained amplifier RV.

The reference value generator SG3 generates the reference value signal W3. In the comparator VGL3, the signals S1 and W3 are compared to one another and an error signal F is generated. The now improved correction signal K/1 is obtained in a correction device KE with the error signal F, with the clock pulse signal T and with the signal S1. In this sample embodiment, it was assumed that the correction signal K/1 proceeds in the range of the dot-dash zero line beginning with time $t=0$ through the time $t=2$. It is thereby signaled that the amplitude a1 of the base band signal B2 occurring at time $t=1$ is not in need of correction. In contrast thereto, the correction signal K/1 has an amplitude a2 beginning with time $t=2$ through the time $t=4$, the amount of the amplitude a2 equaling the amount of the base band signal B3 at the time $t=3$. The amplitudes of the signals B3 and K/1 at the time $t=3$ differ only in different operational sign. The similar case is true at time $t=5$; the amplitudes a3 of the signals B3 and K/1 differ only by operational sign.

A summer SU add the signals B2 and K/1, whereby for the sake of a simpler presentation, it is assumed that the signal B2 has not changed, while the correction signal K/1 is being obtained. In the course of this addition, the distortion-corrected base band signal B3/1 is produced. Thereby, no correction was undertaken at the point P1, because the amplitude of the correction signal K/1 is equal to zero at the time $t=1$. At the points P2 or, respectively, P3, however, corrections were undertaken because the amplitudes of the signal B2 should be equal to zero at the times $t=3$ and $t=5$. Since the amplitude a2 or, respectively, a3 of the signals B3 and K/1 are oppositely directed, the desired zero passages of the distortion corrected base band signal B3/1 occur at the points P2 or, respectively P3. Upon employment of this base band signal B3/1, the signal S1/1 is gained with the assistance of the sample-and-hold circuit S&H. This signal S1/1 is employed in the further sequence for gaining the transmitted data.

The described gain of the control signal S4 is distinguished by the fact that the base band signal B3/1 is corrected precisely at the sampling times $t=1$ or, respectively, $t=3$ or, respectively, $t=5$ which are signaled by the positive pulse edges of the clock pulse signal T. The amplitudes of the signal B3/1, therefore, are only corrected at the points P1, P2, P3 but not in the intervening areas of the signal. For example, the signal B3/1 is not corrected at the times $t=2$ and $t=4$; this is irrelevant, because the amplitudes of the signal are not required at these times anyway. On the other hand, however, it is advantageous to limit the corrections to those signal amplitudes which are indeed required in the evaluation of the data because these required signal amplitudes can be more accurately corrected than with other methods. Therefore, for example, it would be conceivable to obtain the control signal S4 as a function of the peak value of the distortion corrected signal B3. Given this manner of obtaining the control signal, the signal components between the points P1, P2, P3 would be better corrected, however, the amplitudes at the points P1, P2, P3 would be more poorly corrected.

In many cases, it is advantageous to monitor the level of the received base band signal B1 and, for example, to be able to immediately consider interruptions of the line L. In case the levels of the signals B1 and B2 become extremely low in the disruption case, then the correction signal K/1 supplies the significant amounts in the addition and it would be conceivable that a control signal S4 is produced which, on the one hand, increases the amplification factor of the controlled-gained amplifier RV, but which, on the other hand, does not allow one to perceive that this is a matter of a disruptive case. A situation could also be conceived in which, particularly at the beginning of a data transmission, a correction signal K/1 is adjacent to the summer SU with amplitudes which are too great so that the control signal S4 effects a reduction of the amplification factor of the controlled-gain amplifier RV, although the level of the received base band signal B1 is small. In case such conditions cannot be excluded, it is advantageous to indicate those levels of the signal B2 which are too low in order to thereby reduce the level of the correction signal K in the further sequence. In the present sample embodiment, a reference value signal W2 is generated with the reference value generator SG2 and the peak values of the two signals B2 and W2 are compared to one another in the comparator VGL2. In case the peak value of the signal B2 falls below the level of the reference value signal W2, the comparator VGL2 emits a blocking signal SS with whose assistance the amplitudes of the correction signal K/1 are reduced. It would be fundamentally conceivable to interrupt the conductive connection of the correction signal device KE to the summer SU with this blocking signal with the assistance of a switching stage SW (shown in phantom). The control signal S4 would then only be obtained upon consideration of the base band signals B1 or, respectively, B2. Given too small a level of the received base band signal B1, the amplification factor of the controlled-gain amplifier RV would then be increased, the comparator VGL2 would respond to this level increase and the blocking signal SS would eliminate the blockage of the correction signal K/1. However, it would also be conceivable, given too small a level of the signal B2, that coefficient elements be influenced with the blocking signal SS, the coefficient elements being potentially present in the correction device KE and serving for the digital generation of the correction signal K/1.

Figure 2:
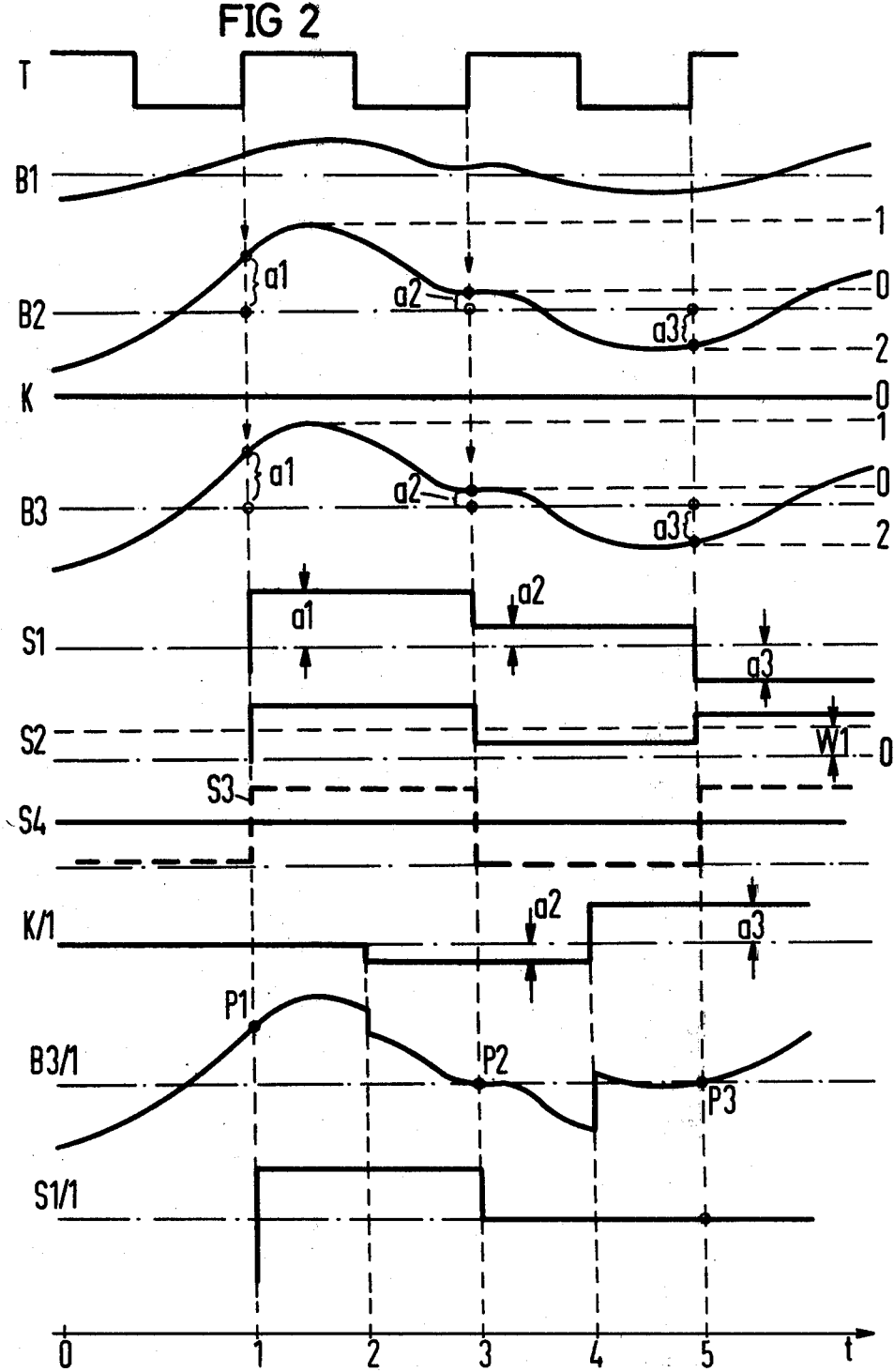
FIG. 2 illustrates a few signals which occur upon operation of the circuit arrangement illustrated in FIG. 1.

On the basis of the description of FIGS. 1 and 2, the clock pulse signal T was assumed as being present. Many known methods relate to the production of such a clock pulse signal T which, however, shall not be discussed because they lie beyond the framework of the present invention. In particular, methods are known according to which the clock pulse signal T can be produced from the distortion corrected signal B3. To that end, given the preconditions of the present invention, a threshold value stage SCH can be provided with whose assistance a first or, respectively, second threshold value is determined and which emits the threshold value signal S5.

FIG. 3 illustrates the manner of operation of the threshold value stage SCH illustrated in FIG. 1. This threshold value stage responds to the two threshold values $SW_1$ or, respectively, $SW_2$ of the distortion corrected base band signal B3 and supplies the threshold value signal S5. Thereby, the threshold value $SW_2$ is exceeded at the point P4 and a positive pulse edge S54 of the threshold value signal S5 arises. Subsequent thereto, the amplitude of the threshold value signal S5 remains constant until the signal B3 exceeds (passes below) the other threshold value $SW_1$. This occurs at the point P5, where a negative pulse edge S55 of the threshold value signal S5 arises. The next positive pulse edge S56 of the threshold value signal S5 arises at the moment in which the signal B3 again exceeds the threshold value $SW_2$ at the point P6. The threshold value signal S5 is supplied t a clock pulse generator TG known per se which generates the clock pulse signal T. Thereby the temporal intervals of the pulse edges S54, S55 and S56 should, on average, equal the period of the clock pulse signal T. Moreover, on the average, the edges S54, or respectively S55 or, respectively, S56 should occur somewhat earlier than the corresponding edges T4 or, respectively, T5 or, respectively T6 of the clock pulse signal T. Given a preferred sample embodiment, the edges S54 or, respectively, S55 or, respectively, S56 of the signal S5 occur, on the average, 1/6 of the period of the clock pulse signal T earlier than the corresponding edges T4 or, respectively, T5 or, respectively, T6.

Although I have described my invention by reference to particular illustrative embodiments thereof, many changes and modifications of the invention may become apparent to those skilled in the art without departing from the spirit and scope of the invention. I therefore intend to include within the patent warranted hereon, all such changes and modifications as may reasonably and properly be included within the scope of my contribution to the art.

I claim:

1. A circuit arrangement for the automatic, adaptive, temporal distortion correction of the ringings of an at least three-stage base band signal transmitter over a loaded line, comprising:
   a controlled-gain amplifier including an input connection to the line, a control input and an output;
   a summer including a first input connected to said output of said controlled-gain amplifier, a second input and an output;
   a sample-and-hold circuit including an input connected to said output of said summer and an output;
   first comparison means including a first input connected to said output of said sample-and-hold circuit, a second input connected to a first reference value and an output connected to said control input of said controlled-gain amplifier;
   second comparison means including a first input connected to said output of said first comparison means, a second input connected to a second reference value, and an output; and
   correction signal means including a first input connected to said output of said sample-and-hold circuit and a second input connected to said output of said second comparison means and an output connected to said second input of said summer, and operable to produce a correction signal for said summer.

2. The circuit arrangement of claim 1, and further comprising:
   third comparison means including a first input connected to said output of said controlled-gain amplifier, a second input connected to a third reference value, and an output connected to said correction signal means for emitting a blocking signal to reduce the value of the correction signal in response to the output signal of said controlled-gain amplifier falling below said third reference value.

3. The circuit arrangement of claim 2, wherein said correction signal means comprises:
   a digital arithmetic unit for generating the correction signal, including coefficient elements connected to receive and be adjusted by the blocking signal.

4. The circuit arrangement of claim 2, and further comprising:
   threshold value means including an input connected to said output of said summer and an output, and responsive to the output voltage of said summer to produce pulses having first edges in response to attaining a first threshold valve and oppositely directed second edges in response to attaining a second threshold value; and
   clock pulse generating means including an input connected to said output of said threshold value means and an output connected to said correction signal means, and operable in response to said first and second edges to generate timing pulses.

5. The circuit arrangement of claim 4, wherein:
   said sample-and-hold circuit comprises a control input connected to said output of said clock pulse generating means.

6. The circuit arrangement of claim 4, wherein:
   said clock pulse generating means includes structure which responds to the respective threshold value crossing to delay generation of the clock pulses approximately 1/6 of a period with respect to said first and second edges.

7. A circuit arrangement for the automatic, adaptive, temporal distortion correction of the ringings of an at least three-stage base band signal transmitted over a loaded line, comprising:
- a controlled-gain amplifier for connection to the transmission line;
- a summer connected to said controlled-gain amplifier;
- a sample-and-hold circuit connected to said summer;
- a first comparator connected to said sample-and-hold circuit and to a first reference value, and connected to control said controlled-gain amplifier;
- second comparison means connected to said first comparison means and to a second reference value;
- threshold value means connected to said summer and responsive to the output voltage thereof to produce pulses having first edges and oppositely directed second edges in response to that voltage passing first and second threshold values, respectively;
- clock pulse generating means connected to and responsive to the first and second edges produced by said threshold value means to produce clock pulses;
- third comparison means connected to said controlled-gain amplifier and to a third reference value to produce a blocking signal in response when the output voltage of said controlled-gain amplifier falls below the third threshold value; and
- correction signal means connected to said clock pulse generating means, said sample-and-hold circuit, said second comparison means and said third comparison means and responsive to the operation thereof to and connected to provide a distortion correction signal to said summer.

8. The circuit arrangement of claim 7, and further comprising:
- a rectifier connected between said sample-and-hold circuit means and said first comparison means; and
- a filter connected between said first comparison means and said controlled-gain amplifier.

9. The circuit arrangement of claim 7, and further comprising:
- a switch connected between said correction signal means and said summer and connected to and operated by said third comparison means to connect the correction signal to eliminate blockage at low signal levels of the base band signal.

* * * * *